(12) United States Patent
Schmid et al.

(10) Patent No.: US 9,366,486 B2
(45) Date of Patent: Jun. 14, 2016

(54) HEAT EXCHANGER

(71) Applicant: Behr GmbH & Co. KG, Stuttgart (DE)

(72) Inventors: Caroline Schmid, Stuttgart (DE); Michael Moser, Rainau (DE); Nikolaus Daubitzer, Stuttgart (DE); Holger Schroth, Maulbronn (DE); Heiko Neff, Auenwald (DE); Dominique Raible, Rottenburg (DE); Anton Kierig, Stuttgart (DE); Thomas Schiehlen, Altheim (DE)

(73) Assignee: MAHLE International GmbH, Stuttgart (DE)

( * ) Notice: Subject to any disclaimer, the term of this patent is extended or adjusted under 35 U.S.C. 154(b) by 281 days.

(21) Appl. No.: 14/038,878

(22) Filed: Sep. 27, 2013

(65) Prior Publication Data

US 2014/0090810 A1  Apr. 3, 2014

(30) Foreign Application Priority Data

Sep. 28, 2012 (DE) .......................... 10 2012 217 871

(51) Int. Cl.
*F28D 7/02* (2006.01)
*F28F 3/12* (2006.01)
(Continued)

(52) U.S. Cl.
CPC ... *F28F 1/00* (2013.01); *F28F 3/12* (2013.01); *F28F 13/06* (2013.01); *F28F 21/067* (2013.01);
(Continued)

(58) Field of Classification Search
CPC . F28D 2021/0043; F28D 1/03; F28D 1/0308; F28D 1/0325; F28D 1/0341; F28D 1/035; F28D 1/0366; F28D 1/0383; F28F 3/02; F28F 3/022; F28F 3/04; F28F 3/042; F28F 3/044; F28F 3/048; F28F 3/12; F28F 3/14; H01M 10/613; H01M 10/635; H01M 10/66
See application file for complete search history.

(56) References Cited

U.S. PATENT DOCUMENTS 4,471,759 A * 9/1984 Anderson et al. ............. 126/626
4,871,017 A * 10/1989 Cesaroni ....................... 165/170
(Continued)

FOREIGN PATENT DOCUMENTS

DE    20 2012 102 349 U1    9/2012

OTHER PUBLICATIONS

German Search Report, Application No. DE 10 2012 217 871.6, Jul. 31, 2013, 5 pgs.

*Primary Examiner* — Allen Flanigan
*Assistant Examiner* — Jason Thompson
(74) *Attorney, Agent, or Firm* — Paul D. Strain, Esq.; Strain & Strain PLLC

(57) ABSTRACT

Heat exchanger having a housing, having a fluid inlet and having a fluid outlet, wherein the heat exchanger is in fluid communication via the fluid inlet and the fluid outlet with a fluid circuit, having a flow-guiding element in the interior of the housing, wherein the housing is formed from a substantially planar housing upper part and a substantially trough-like housing lower part, wherein the housing lower part has a base region and an encircling side wall, wherein the housing lower part is formed by a supporting structure and an encasement and the supporting structure is at least partially surrounded by the encasement, wherein the supporting structure is formed from a metallic material, and the encasement is formed substantially from a plastic, wherein the housing upper part is formed from a plastic and the housing lower part is connected to the housing upper part substantially by means of plastic-on-plastic contact.

12 Claims, 4 Drawing Sheets

(51) Int. Cl.
*F28F 3/14* (2006.01)
*F28F 1/00* (2006.01)
*F28F 13/06* (2006.01)
*F28F 21/06* (2006.01)
*H01M 10/6556* (2014.01)
*H01M 10/617* (2014.01)
*F28D 21/00* (2006.01)
*H01M 10/625* (2014.01)

(52) U.S. Cl.
CPC ........ *H01M 10/617* (2015.04); *H01M 10/6556* (2015.04); *F28D 2021/0043* (2013.01); *F28F 2275/14* (2013.01); *H01M 10/625* (2015.04)

(56) References Cited

U.S. PATENT DOCUMENTS

| | | | | |
|---|---|---|---|---|
| 5,941,091 | A * | 8/1999 | Broadbent | 62/347 |
| 6,058,101 | A * | 5/2000 | Huang et al. | 370/208 |
| 7,121,002 | B1 * | 10/2006 | Roth | 29/890.039 |
| 2001/0016985 | A1 * | 8/2001 | Insley et al. | 29/890.039 |
| 2004/0148858 | A1 * | 8/2004 | Yamamoto et al. | 48/127.9 |
| 2004/0150271 | A1 * | 8/2004 | Koga et al. | 310/64 |
| 2008/0066893 | A1 | 3/2008 | Oh et al. | |
| 2012/0237805 | A1 | 9/2012 | Abels et al. | |
| 2015/0086831 | A1 * | 3/2015 | Haussmann | 429/120 |

\* cited by examiner

HEAT EXCHANGER

CROSS-REFERENCE TO RELATED PATENT APPLICATIONS

This application is based upon and claims the benefit of priority from prior German Patent Application No. 10 2012 217 871.6, filed Sep. 28, 2012, the entire contents of which are incorporated herein by reference in their entirety.

TECHNICAL FIELD

Heat exchanger having a housing, having a fluid inlet and having a fluid outlet, wherein the housing is in fluid communication via the fluid inlet and the fluid outlet with a fluid circuit, having a flow-guiding element in the interior of the housing, wherein the housing is formed from a housing upper part and a trough-like housing lower part, wherein the housing lower part has a base region and an encircling side wall.

PRIOR ART

In electric vehicles, energy stores are used for operating an electric motor. As energy stores, use is often made of storage batteries based on lithium-ion technology, or of nickel-metal hydride storage batteries. Alternatively, use is also made of high-performance capacitors, so-called super-caps.

In the case of all of the energy stores mentioned, an intense generation of heat occurs during operation, in particular during fast charging and discharging of the energy stores.

Temperatures of approximately 50° C. and higher may however damage the energy stores and significantly reduce the service life thereof. Likewise, excessively low temperatures cause lasting damage to the energy stores.

To maintain the performance of the energy stores, the temperature of these must therefore be actively controlled. Periods where cooling is required are more prevalent by far. The cooling may be realized for example by the introduction of heat exchangers through which fluid flows. In solutions according to the prior art, the heat exchangers are often elements through which fluid flows and which have, between two areal cover plates, one or more fluid ducts through which a fluid can flow.

It is advantageous here for all of the cells of the energy store to be kept at a uniform temperature level. Likewise, intense temperature gradients within the cells should be avoided.

The plates of the heat exchangers can be traversed by a flow of a cold fluid during cooling, though may also be traversed by a flow of a warm fluid for the purpose of heating.

To attain the highest possible energy efficiency, in particular in electric vehicles, a design which is optimized as far as possible with regard to weight is advantageous.

In the prior art, solutions are described which use heat exchangers manufactured from metallic materials. Such a solution is disclosed for example by the utility model DE 20 2012 102 349 U1.

To produce a cooling body through which a fluid flows, it is for example known to connect a stamped metal sheet to a planar metal sheet such that the fluid can flow through the cavity formed by the two metal sheets. Here, for the purposes of electrical insulation, the metal sheets, after being connected, are laminated with a plastics foil. The metal sheets are in this case often formed from lightweight metals, for example aluminum or an aluminum alloy.

A disadvantage of the solutions according to the prior art is in particular that the heat exchangers are composed entirely from a metallic material, for example aluminum. These are considerably heavier in relation to designs composed of plastic or of a mixture of aluminum and plastic. Also, owing to the electrical conductivity of the metal, there is a need for insulation, which may exhibit greater or lesser complexity, and potential equalization means for the heat exchangers. Furthermore, the production of heat exchangers from aluminum is energy-intensive and expensive. Furthermore, as a result of the use of brazing materials such as flux, for example, reworking steps are often necessary.

PRESENTATION OF THE INVENTION, PROBLEM, SOLUTION, ADVANTAGES

It is therefore the object of the present invention to provide a heat exchanger which has a weight-optimized design and the production of which is less energy-intensive and less expensive. Furthermore, the heat exchanger should be formed without additional thermal or electrical insulation.

The object of the present invention is achieved by means of a heat exchanger having the features of claim 1.

An exemplary embodiment of the invention relates to a heat exchanger having a housing, having a fluid inlet and having a fluid outlet, wherein the housing is in fluid communication via the fluid inlet and the fluid outlet with a fluid circuit, having a flow-guiding element in the interior of the housing, wherein the housing is formed from a housing upper part and a trough-like housing lower part, wherein the housing lower part has a base region and an encircling side wall, wherein the housing lower part has a supporting structure and an encasement, wherein the supporting structure is at least partially surrounded by the encasement and is formed from a metallic material, and the encasement is formed from a plastic, wherein the housing upper part is formed from a plastic and the housing lower part is connected to the housing upper part by means of plastic-on-plastic contact.

In one exemplary embodiment, the heat exchanger according to the invention serves to control the temperature of an energy accumulator.

A heat exchanger composed of a combination of a metallic material and a plastic is characterized by a particularly low weight in relation to a heat exchanger manufactured entirely from metal. Furthermore, by means of the housing upper part formed from plastic, electrical insulation and also additional thermal insulation are attained. A high level of dimensional stability of the housing is also ensured by means of a metallic material of the supporting structure.

In a further advantageous embodiment, it may be provided that a flow-guiding element is arranged in the interior of the housing.

A flow-guiding element in the interior of the housing is particularly advantageous because, by means of such an element, the flow in the interior of the heat exchanger can be influenced in a targeted manner. This may for example lead to more intense mixing of the fluid, which results in a more homogeneous temperature distribution.

It is also advantageous for the supporting structure to have an opening, with the encasement at least partially engaging into or behind the supporting structure in or through said opening.

The encasement can at least partially engage behind the supporting structure through one or more openings in the metallic supporting structure. In this way, the connection between the supporting structure and the encasement can be reinforced because, in addition to the adhesion forces between the plastic of the encasement, which is for example injection-molded onto the supporting structure, a form fit is also generated which fixes the supporting structure in the encasement.

In a particularly preferred embodiment, it may be provided that the flow-guiding element is formed by an elevation which is formed out of the supporting structure.

The flow-guiding element or the flow-guiding elements can be produced in a simple manner by being stamped, for example, into the supporting structure. By means of a stamping process, subregions of the supporting structure are pushed out of the main plane of the supporting structure and are thus elevated above the main plane of the supporting structure. The forming of a flow-guiding element out of the supporting structure itself is particularly expedient because no additional material is required. Furthermore, the formation of elevations out of planar materials by means of stamping, for example, is a known, inexpensive technology which is also suitable for mass production.

It is also advantageous for the flow-guiding element to be arranged in the region of an opening in the supporting structure.

A particular advantage of this is that, while being injection-molded onto the supporting structure, a part of the plastic of the encasement passes through the opening through the opening and thus at least partially engages behind the supporting structure. At the same time, the plastic fills the cavity generated as a result of the forming-out of the flow-guiding element, and thus serves to provide greater stability of the supporting structure.

In one particularly advantageous embodiment, the flow-guiding element has the opening at its tip, that is to say at the point furthest remote from the main plane of the supporting structure. This is particularly advantageous because, in this way, the plastic that penetrates through the opening as it is injection-molded on forms the highest point of the supporting structure, and thus the housing upper part which closes off the housing lower part comes into direct contact with the plastic at the tip of the flow-guiding element. In this way, plastic-on-plastic contact can be generated between the housing lower part and the housing upper part.

In a particularly expedient refinement of the invention, it may be provided that the flow-guiding element is formed by a stud-like formation on the encasement, said formation extending through the opening in the supporting structure, and/or is formed by plastics elements attached to the housing upper part and/or to the supporting structure.

In the case that no flow-guiding element is generated by being formed out of the material of the supporting structure, flow-guiding elements may be formed by that portion of the encasement which penetrates through openings in the supporting structure. The shaping of the flow-guiding elements may in this case be chosen substantially freely. This is particularly advantageous because, in this way, it is made possible for the fluid flow to be influenced in a targeted manner, and at the same time, the overall weight of the heat exchanger remains low.

Flow-guiding elements formed from plastic and arranged in the interior of the housing on the housing upper part or housing lower part are particularly advantageous because the fluid flow in the interior of the housing can be influenced by means thereof. The flow-guiding elements may in this case be injection-molded either onto the housing upper part or onto the housing lower part. Flow-guiding elements generated in this way are optimized with regard to their weight and may be realized in a multiplicity of forms.

By means of a multiplicity of flow-guiding elements that may be arranged in a regular or irregular pattern, it is possible for an advantageous fluid flow pattern to be generated within the housing. In particular, the flow of the fluid can be influenced such that a uniform overall flow through the housing is ensured.

It is also expedient for the supporting structure to be at least partially engaged behind in the region of the side wall by the encasement.

The encasement advantageously engages behind the supporting structure at multiple locations so as to generate a durable form fit. In addition to the openings that may be provided in the supporting structure, it is therefore particularly advantageous for the encasement to engage behind the supporting structure in the region of the side walls also. Furthermore, the encasement, at the location at which it engages behind the supporting structure at the side walls, forms a further connecting point at which the supporting structure can be connected to the housing upper part by way of plastic-on-plastic contact.

Here, "engaging behind" means that the plastic of the encasement is led from the region laterally adjacent to the side walls to a point above the upper region of the side walls, and thus the plastic of the encasement forms the highest point of the housing lower part.

In a particularly expedient refinement of the invention, it may also be provided that, in the assembled state, the encasement is connected to the housing upper part in the region of the opening of the flow-guiding element and/or in the region of the side wall.

At these described regions in particular, it is advantageously possible for plastic-on-plastic contact to be realized between the housing upper part and the housing lower part. This has the effect that the two parts can be connected to one another in a particularly simple manner. Ideally, the plastic-on-plastic contact between the housing upper part and the housing lower part is of fully encircling configuration, such that the housing upper part and housing lower part can be connected to one another in a fluid-tight manner in one working step.

It is furthermore advantageous for the supporting structure and the encasement to be connected to one another in a form-fitting and/or cohesive manner.

A form-fitting and/or cohesive connection is advantageous in order to be able to attain the longest possible service life of the heat exchanger. Here, it is for example conceivable for the encasement to be ready-manufactured as a separate part and for the supporting structure to be pressed into said encasement. The production of the encasement is realized here by means of injection molding, for example. The prevalent form of connection in this case is the form fit generated by the engagement of the encasement into and/or behind the supporting structure.

Alternatively, the encasement may also be injection-molded directly onto the supporting structure. In this case, a cohesive connection is also generated in addition to the positively locking connection.

It is also expedient for the heat exchanger to have the fluid inlet and the fluid outlet on the housing upper part or on the housing lower part.

For the connection to a fluid circuit, the heat exchanger advantageously has a fluid inlet and a fluid outlet. Depending on the available installation space, an arrangement of the fluid inlet and of the fluid outlet either on the housing upper part or on the housing lower part may be advantageous.

It is furthermore preferable for the heat exchanger to have the fluid inlet on the housing upper part and the fluid outlet on the housing lower part, or for the heat exchanger to have the fluid outlet on the housing upper part and the fluid inlet on the housing lower part.

If, for example, the heat exchanger is used in a series circuit with one or more further heat exchangers, it may be advantageous for the fluid inlet or the fluid outlet to be arranged on the housing upper part and for the respective other fluid inlet or outlet to be arranged on the housing lower part of the heat exchanger.

It is also advantageous for the internal volume of the housing to be divided into at least one first chamber and one second chamber which are in fluid communication with one another at at least one location.

By means of such a division of the internal volume of the heat exchanger, it is possible to attain a flow through the heat exchanger whereby the fluid is, overall, diverted through approximately 180° in terms of its main flow direction substantially once. Here, the fluid flows through the heat exchanger for longer than in the case of a single-throughflow configuration in which the fluid flows in at one end of the heat exchanger and flows out again at the opposite end, whereby an increased transfer of heat is possible overall. Furthermore, it is possible in this way to attain a more homogeneous temperature distribution in the heat exchanger.

In a particularly preferred embodiment of the invention, it may also be provided that the housing lower part has a U-shaped basic shape formed by two legs and by a connecting region, wherein the fluid inlet and the fluid outlet are arranged in each case on one of the end regions, facing away from the connecting region, of the legs.

By means of such a configuration of the heat exchanger, it is achieved that the fluid flows through the heat exchanger in a predefined direction. Here, the fluid flows into the heat exchanger through the fluid inlet and flows along one of the legs to the connecting region which connects the legs to one another in one of the end regions thereof. From there, the fluid flows into the second leg and, having been diverted substantially through 180°, flows to the fluid outlet in a countercurrent configuration with respect to the first leg.

Advantageous refinements of the present invention are described in the subclaims and in the following description of the figures.

BRIEF DESCRIPTION OF THE DRAWINGS

The invention will be explained in detail below on the basis of exemplary embodiments and with reference to the drawings, in which.

PREFERRED EMBODIMENT OF THE INVENTION

Figure 1:
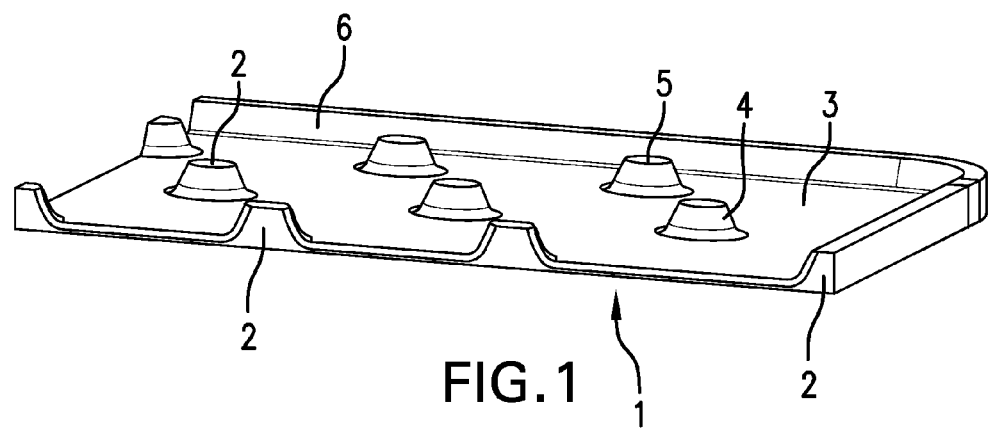
FIG. 1 shows a perspective view of the housing lower part, having a metallic supporting structure with a base region and side walls which are partially surrounded and engaged behind by an encasement.

FIG. 1 shows a perspective partial view of the housing lower part 1. The housing lower part 1 is formed substantially by a supporting structure 3 which is partially surrounded by an encasement 2. Here, the supporting structure is composed of a metallic material and is formed substantially by a planar surface which has laterally encircling, turned-up side walls 6.

In the base surface 7 of the supporting structure 3 there are arranged flow-guiding elements 4 which are illustrated in FIG. 1 as stud-like formations. Said flow-guiding elements 4 may be generated out of the base material of the supporting structure 3 for example by means of a stamping process. Here, the flow-guiding elements 4 may be formed into the supporting structure 3 either in regular patterns or in irregular patterns. The flow-guiding elements shown in FIG. 1 have an opening 5 at their tip facing away from the supporting structure 3.

As a result of the fully encircling side walls 6, a trough-like structure of the supporting structure 3 is formed. Such a structure of the supporting structure 3 may be generated for example by means of a deep-drawing process. The supporting structure 3 is advantageously formed from a material that exhibits good heat conduction, such as aluminum or an aluminum alloy.

In the illustration of FIG. 1, the supporting structure 3 is at least partially engaged behind by an encasement 2 which is advantageously composed of a plastic. The encasement 2 is a plastic which is injection-molded on, said plastic having been injection-molded around the supporting structure 3 from the outside.

Here, the plastic of the encasement 2 completely fills the flow-guiding elements 4 that have been formed out of the base material of the supporting structure 3. Here, as it is injection-molded on, the plastic of the encasement 2 also passes upwards through the supporting structure 3 through the openings 5 of the flow-guiding elements 4, and thus at least partially engages behind the flow-guiding elements 4. The side walls 6 of the supporting structure 3 are likewise engaged behind by the plastic of the encasement 2. The exact design of said plastics encasement is explained in FIG. 3.

The supporting structure 3 is thus connected to the encasement 2 by means of a form-fitting connection generated both at the openings 5 of the flow-guiding elements 4 and also at the upper end regions of the side walls 6.

In an alternative embodiment, the housing lower part could also have a supporting structure which has merely a multiplicity of openings instead of the formed-out flow-guiding elements. Said openings may then likewise be filled, and at least partially covered by the plastic of the encasement such that a form fit is generated between the encasement and the supporting structure, as a result of the encasement being injection-molded on. Alternatively, it would also be possible for flow-guiding elements to be formed only from the plastics compound of the encasement. A flow-guiding element formed purely from plastic could be configured in a very free manner with regard to its shape.

The housing lower part 1 is configured such that in each case those sides of the supporting structure 3 which face away from the base surface are fully engaged behind by the encasement 2. In this way, the plastic of the encasement 2 is the element that forms a termination of the supporting structure 3 in the upward direction. This is particularly advantageous because, at a later point in time, a housing upper part is placed onto the housing lower part 1. Here, the housing upper part is preferably composed of a plastic.

By means of the design of the housing lower part 1 as described in FIG. 1, it is possible to produce a purely plastic-on-plastic connection between the housing lower part 1 and the housing upper part. The housing lower part 1 and the housing upper part can be connected to one another in a particularly simple manner owing to the contact with identical materials. Here, use may for example be made of welding processes for connecting two plastics to one another in a fluid-tight manner. This is particularly advantageous because such processes are inexpensive and can be implemented within the context of mass production. Furthermore, it is not necessary for metallic material to be joined or reworked.

Figure 2:
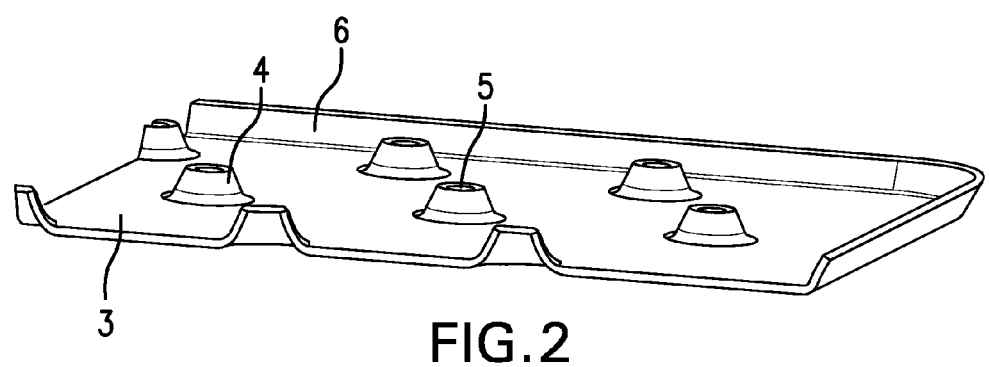
FIG. 2 shows a perspective view of the metallic supporting structure as per FIG. 1.

FIG. 2 shows the supporting structure 3 already illustrated in FIG. 1 in a detail view. The figure shows substantially the multiplicity of flow-guiding elements 4 that are formed out of the supporting structure 3 by means of a stamping process. The flow-guiding elements 4 have an opening 5 at their uppermost point. Likewise shown are the side walls 6 which make the supporting structure 3 into a trough-like element.

Figure 3:
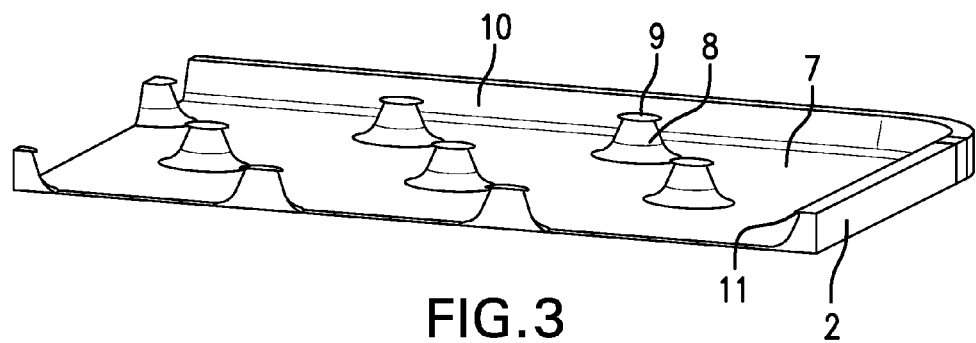
FIG. 3 shows a perspective view of the encasement as per FIG. 1.

The encasement 2 already shown in FIG. 1 is shown in a detail view in FIG. 3. It can be seen particularly clearly that the encasement 2 is formed so as to substantially replicate the outer contour of the supporting structure 3. Accordingly, the encasement 2 likewise has side walls 10 which are adapted to the angle of inclination and the height of the side walls 6 of the supporting structure 3. At the upper end region of the side walls 10, the encasement 2 has an encircling lip 11 which engages in each case behind the upper regions of the side walls 6 of the supporting structure 3. By means of the encircling lip 11, a form fit is generated between the encasement 2 and the supporting structure 3. Furthermore, it is ensured in this way that the highest point of the housing lower part 1 is formed by the plastic of the encasement 2.

It can also be seen that studs 8 are formed in the encasement 2, which studs, in the final assembled state, are situated in the interior of the flow-guiding elements 4 of the supporting structure 3. It is possible in FIG. 3 to see particularly clearly the plate-like protrusion 9 on the end of the studs 8. Said plate-like protrusion 9 engages behind the flow-guiding elements 4 of the supporting structure 3 and thus generates a further form fit between the encasement 2 and the supporting structure 3. Furthermore, it is achieved by means of the plate-like protrusion 9 that a plastic-on-plastic connection is generated here, too, between the housing lower part 1 and the housing upper part.

The encasement 2 serves firstly to provide electrical insulation of the supporting structure 3 and also to seal off the housing.

The supporting structure 3 and the encasement 2 are thus connected to one another both by means of a form-fitting engaging-behind configuration and also as a result of the natural adhesion between the plastic and the supporting structure 3. Owing to the high plastics content of the housing lower part 1, the embodiment shown is of significantly lower weight than, for example, an embodiment manufactured entirely from metallic materials.

Figure 4:
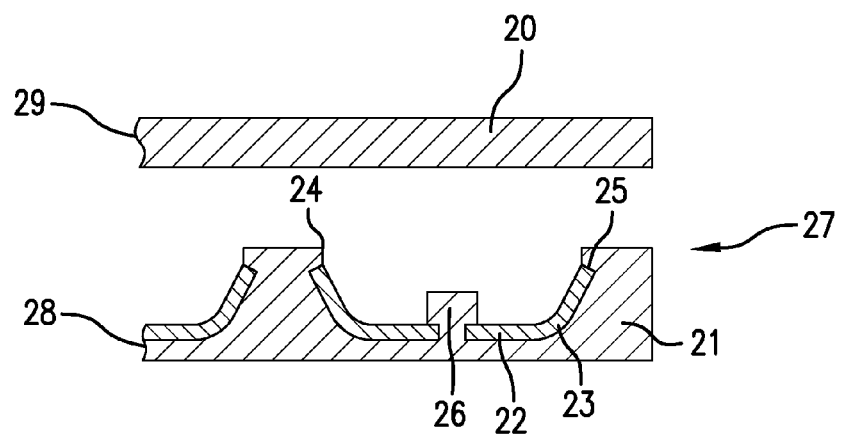
FIG. 4 shows a section through the housing upper part and the housing lower part, wherein the housing lower part has additional flow-guiding elements.

FIG. 4 shows a section through a subregion of the heat exchanger 27. Situated opposite the housing lower part 28 is a housing upper part 29.

It can be clearly seen that those regions of the housing lower part 28 which face in each case towards the housing upper part 29 are composed in each case of the plastic of the encasement 21. The plastic-on-plastic contact, already described above, between the housing lower part 28 and the housing upper part 29 is generated in this way.

As is the case in the preceding FIGS. 1 to 3, it is also the case in FIG. 4 that a supporting structure 22 is surrounded by an encasement 21. The supporting structure 22 has flow-guiding elements 23 which, similarly to FIGS. 1 to 3, have been formed out by means of a stamping process. The flow-guiding elements 23 are completely filled by the plastic of the encasement 21. At the openings of the flow-guiding elements 23, the plastic engages behind the supporting structure 22. At the edge regions of the supporting structure 22, the encasement 21 engages, by way of a lip 25, behind the supporting structure 22.

In addition to FIGS. 1 to 3, a further alternative configuration of flow-guiding elements is now illustrated in FIG. 4. The flow-guiding element 26 is generated by an additional opening formed in the supporting structure 22. The flow-guiding element 26 is composed entirely of the plastic that also forms the encasement 21.

The flow-guiding element 26 is produced by plastic which, as it is injection-molded on, penetrates through the opening into the supporting structure 22. Here, the shaping of the flow-guiding element 26 may occur either without specific guidance or else through the provision of a mold part which is arranged on the inner side of the supporting structure 22 as the plastic is injection-molded on, whereby the plastic flowing through the opening has a specific shape imparted to it there.

Figure 5:
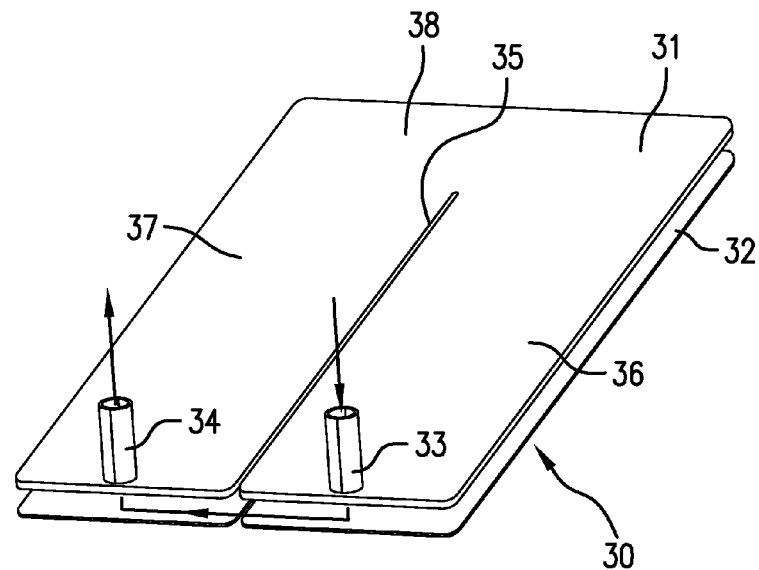
FIG. 5 shows a perspective view of a heat exchanger having a housing formed from a housing lower part as per FIGS. 1 to 4 and a housing upper part, wherein the heat exchanger has a U-shaped basic shape which is formed by two legs and by a connecting region which connects the two legs.

FIG. 5 shows a perspective view of a heat exchanger 30 which is formed from a housing lower part 31 and a housing upper part 32, as have already been described in FIGS. 1 to 4. The housing lower part 31 has, on its outer side, a fluid inlet 33 and a fluid outlet 34. Here, the housing lower part 31 has a U-shaped basic shape. The U-shaped basic shape is formed substantially by two legs 36, 37 running parallel to one another and by a connecting region 38 which connects the leg 36 to the leg 37. The two legs 36, 37 are separated from one another over the major part of their extent by the gap 35.

The housing upper part 32 is formed so as to substantially replicate the basic shape of the housing lower part 31. The housing upper part 32 is composed of plastic. By means of the housing upper part 32, the housing lower part 31 can be closed off in a fluid-tight manner with an accurate fit.

As an alternative to the embodiment shown in FIG. 5, the fluid inlet 33 and the fluid outlet 34 may also be arranged on the housing upper side 32. It may also be provided that the fluid inlet is arranged on the housing lower part 31 and the fluid outlet is arranged on the housing upper part. A reversal of this arrangement may likewise be provided.

In the embodiment shown in FIG. 5, both the fluid inlet 33 and also the fluid outlet 34 are arranged on one of the end regions of the legs 36, 37. The connecting region 38 of the housing lower part 31 is arranged at the other end of the legs 36, 37. The heat exchanger 30 is accordingly filled with a fluid through the fluid inlet 33, which fluid then propagates through the heat exchanger 30 along the leg 36. At the connecting region 38, the fluid flows over from the leg into the leg 37 and, in so doing, is diverted substantially through 180° in terms of its main flow direction. Subsequently, the fluid flows through the leg 37 back in the direction of the fluid outlet 34. It is ensured in this way that a directed fluid flow is generated within the heat exchanger 30, and the fluid flows around all of the regions of the heat exchanger 30.

Owing to the two legs 36, 37, it is practically the case that two chambers are formed in the interior of the heat exchanger 30, said chambers being in fluid communication with one another via the connecting region 38. Here, the connecting region 38 permits the passage of fluid between the two chambers.

As an alternative to the design shown in FIG. 5, which has a gap 35 for separating the legs 36, 37, provision may likewise be made for the housing lower part 31 to be formed with a rectangular basic shape and for a partition to be arranged in the interior of the heat exchanger, which partition divides the interior volume of the heat exchanger substantially into a first chamber and a second chamber. Here, the partition is designed such that the first chamber and the second chamber are in fluid communication with one another at at least one location. The housing upper part 32 is in this case likewise formed with a substantially rectangular basic shape. Here, the gap shown in FIG. 5 is optional and may also be omitted.

An advantage of the illustration shown in FIG. 5 is that thermal insulation is provided between the leg 36 and the leg 37 owing to the gap 35. Assuming that the temperature levels of the fluid in the legs 36, 37 differ from one another, a temperature equalization between the fluid in the leg 36 and that in the leg 37 is thus prevented.

Figure 6:
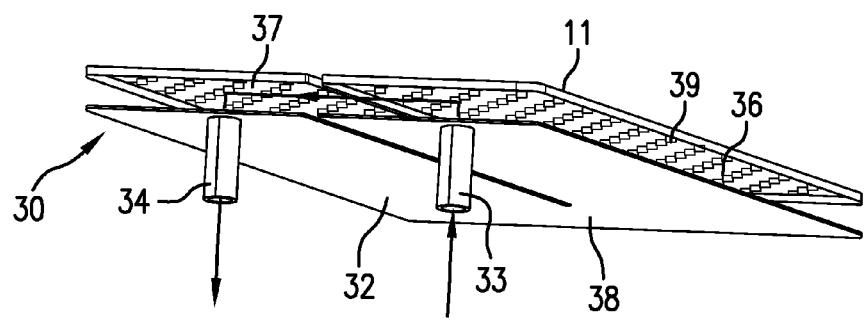
FIG. 6 shows a further perspective view of a heat exchanger as per FIG. 5.
Figure 7:
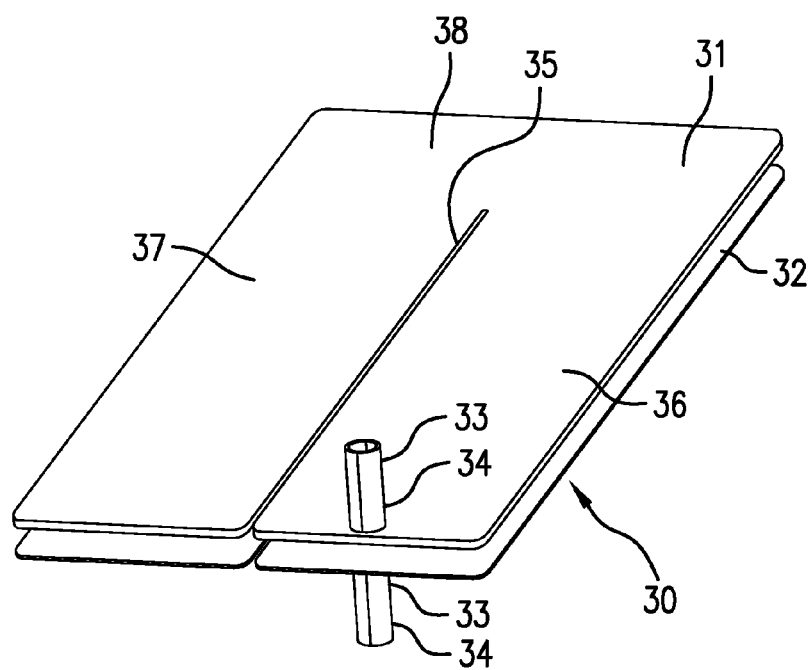
FIG. 7 shows a further perspective view of an embodiment of heat exchanger according to the present application.

FIG. 6 shows a view of a heat exchanger 30 as per FIG. 5. In addition to FIG. 5, it is now also possible to see the manner in which the flow-guiding elements 39 are arranged in the housing lower part 31. As already shown in and explained with regard to FIGS. 1 to 4, a multiplicity of flow-guiding elements 39 is arranged on the supporting structure of the housing lower part 31. The flow-guiding elements 39 serve firstly for the control of the fluid flow in the interior of the heat exchanger 30, and at the same time, by means of the flow-guiding elements, the most turbulent possible flow is generated within the heat exchanger 30 so as to ensure as uniform as possible a temperature level within the heat exchanger 30.

The heat exchanger 30 in FIGS. 5 and 6 is traversed by flow in each case in a U-shaped throughflow configuration. In alternative embodiments, provision may likewise be made for a heat exchanger having a housing lower part and/or a housing upper part as described in the figures to be produced which is traversed by a flow in an I-shaped throughflow configuration. For this purpose, the arrangement of the fluid inlet and of the fluid outlet would need to be selected accordingly.

A housing lower part 1, 31 as shown in FIGS. 1 to 6 may basically be designed with any basic shape. The substantially rectangular basic shape, shown in FIGS. 1 to 6, of the housing lower part 1, 31 or of the housing upper part 32 is in this case merely exemplary and does not constitute a limitation. Likewise, the fluid inlets 33 and fluid outlets 34 which are shown should be understood merely as an exemplary illustration for a fluid inlet and a fluid outlet. In addition to the tubular connecting pieces shown, it would for example also be possible to provide angled pipelines or simple openings which are connected via feed and discharge lines. The shaping and arrangement of the flow-guiding elements 4, 23, 26, 39 are also merely exemplary and are not of a limiting nature.

The invention claimed is:

1. A heat exchanger comprising:
a housing, a fluid inlet, and a fluid outlet, wherein the housing is in fluid communication via the fluid inlet and the fluid outlet with a fluid circuit,
a flow-guiding element in an interior of the housing, wherein the housing is formed from a housing upper part and a trough-like housing lower part,
wherein the housing lower part has a base region, a supporting structure, and an encircling side wall defined by an encasement, wherein the supporting structure is at least partially surrounded by the encasement and is formed from a metallic material, and the encasement is formed from a plastic,
wherein the supporting structure has at least one opening, wherein the encasement at least partially engages into or behind the supporting structure through the at least one opening,
wherein the housing upper part is formed from a plastic and the housing lower part is connected to the housing upper part by means of plastic-on-plastic contact
where the flow-guiding element is formed by a projection from the housing lower part which projects into the interior of the housing and projects through the supporting structure, wherein the opening in the supporting structure is arranged adjacent to an apex of the flow-guiding element.

2. The heat exchanger according to claim 1,
wherein the flow-guiding element is formed by a stud-like formation on the encasement, said formation extending through the opening in the supporting structure, or is formed by plastic elements attached to the housing upper part, said plastic elements extending through the opening in the supporting structure.

3. The heat exchanger according to claim 1,
wherein the supporting structure is at least partially engaged behind in a region of the side wall by the encasement.

4. The heat exchanger according to claim 1,
wherein, in an assembled state, the encasement is connected to the housing upper part in a region of an opening of the flow-guiding element or in a region of the side wall.

5. The heat exchanger according to claim 1, wherein the supporting structure and the encasement are connected to one another in a form-fitting or cohesive manner.

6. The heat exchanger according to claim 1,
wherein the fluid inlet and the fluid outlet are arranged on the housing upper part or on the housing lower part.

7. The heat exchanger according to claim 1,
wherein the heat exchanger has the fluid inlet on the housing upper part and the fluid outlet on the housing lower part, or in that the heat exchanger has the fluid outlet on the housing upper part and the fluid inlet on the housing lower part.

8. The heat exchanger according to claim 1,
wherein an internal volume of the housing is divided into at least one first chamber and one second chamber which are in fluid communication with one another in at least one location.

9. The heat exchanger according to claim 1,
wherein the housing lower part has a U-shaped basic shape formed by two legs and by a connecting region, wherein the fluid inlet and the fluid outlet are arranged in each case on one of a plurality of end region of the two legs which are facing away from the connecting region.

10. A heat exchanger comprising:
a housing, a fluid inlet, and a fluid outlet, wherein the housing is in fluid communication via the fluid inlet and the fluid outlet with a fluid circuit,
a plurality of flow-guiding elements in an interior of the housing, wherein the housing is formed from a housing upper part and a trough-like housing lower part,
wherein the housing lower part comprises a supporting structure and an encasement, wherein the supporting structure is formed from a metallic material and comprises a base region, an encircling side wall at the edge of the base region bounding the interior of the housing, and a plurality of openings in the base region, wherein the encasement is formed from a plastic material and at least partially surrounds the base region and the encircling side wall an outer side of the housing, wherein each of the plurality of flow-guiding elements comprises a region projecting into the interior of the housing, wherein said region comprises:

(i) a portion of the encasement projecting through on of the plurality of openings, or (ii) a portion of the base region projecting into the interior of the housing such that an opening in the supporting structure is arranged adjacent an apex of said portion, wherein the encasement further comprises a plurality of elevated regions corresponding to an inside portion of the flow-guiding elements, wherein the elevated regions pass through the openings adjacent to the apex, wherein the housing upper part is formed from a plastic and the housing lower part is connected to the housing upper part by means of plastic-on-plastic contact of the housing upper part and the encircling wall or elevated regions of the housing lower part.

11. The heat exchanger according to claim 10,
wherein the region projecting into the interior of the housing comprises a portion of the encasement projecting through on of the plurality of openings.

12. The heat exchanger according to claim 10,
wherein the region projecting into the interior of the housing comprises a portion of the base region projecting into the interior of the housing such that an opening in the supporting structure is arranged adjacent to the apex of said portion, wherein the encasement further comprises a plurality of elevated regions corresponding to an inside portion of the flow-guiding elements, wherein the elevated regions pass through the openings adjacent the apex.

\* \* \* \* \*